(12) United States Patent
Singh et al.

(10) Patent No.: US 7,139,358 B2
(45) Date of Patent: Nov. 21, 2006

(54) BELOW GRADE CASK TRANSFER FACILITY

(75) Inventors: Krishna P. Singh, Palm Harbor, FL (US); Stephen J. Agace, Maple Shade, NJ (US)

(73) Assignee: Holtec International, Inc., Marlton, NJ (US)

( * ) Notice: Subject to any disclaimer, the term of this patent is extended or adjusted under 35 U.S.C. 154(b) by 81 days.

(21) Appl. No.: 10/915,066

(22) Filed: Aug. 10, 2004

(65) Prior Publication Data

US 2005/0008462 A1 Jan. 13, 2005

Related U.S. Application Data

(62) Division of application No. 10/068,093, filed on Feb. 5, 2002, now Pat. No. 6,793,450.

(51) Int. Cl.
*G21C 19/00* (2006.01)
(52) U.S. Cl. ............ 376/272; 376/273; 376/260; 414/146
(58) Field of Classification Search ............ 376/272, 376/268, 269, 273, 260; 588/1; 250/507.1, 250/506.1
See application file for complete search history.

(56) References Cited

U.S. PATENT DOCUMENTS

| | | | |
|---|---|---|---|
| 3,755,079 A | 8/1973 | Weinstein et al. | |
| 3,800,973 A | 4/1974 | Weaver | |
| 3,945,509 A | 3/1976 | Weems | |
| 4,055,508 A | 10/1977 | Yoli et al. | |
| 4,374,801 A * | 2/1983 | Albin | 376/264 |
| 4,585,611 A | 4/1986 | Perl | |
| 4,755,347 A * | 7/1988 | Tolmie | 376/272 |
| 4,866,286 A * | 9/1989 | Baatz et al. | 250/507.1 |
| 5,267,280 A | 11/1993 | Duquesne | |
| 5,297,917 A | 3/1994 | Freneix | |
| 5,469,936 A | 11/1995 | Lauga et al. | |
| 5,862,195 A | 1/1999 | Peterson, II | |
| 5,920,602 A * | 7/1999 | Botzem et al. | 376/272 |
| 6,359,953 B1 * | 3/2002 | Faser et al. | 376/268 |

FOREIGN PATENT DOCUMENTS

| | | |
|---|---|---|
| DE | 195 357 A1 | 8/1995 |
| EP | 1 061 011 A1 | 6/2000 |
| FR | 2 434 463 | 8/1979 |
| JP | 10-170698 * | 6/1998 |

* cited by examiner

*Primary Examiner*—Ricardo J. Palabrica
(74) *Attorney, Agent, or Firm*—Wolf, Block, Schorr & Solis-Cohen; Brian L. Belles (57) ABSTRACT

A system and method for transferring a canister of spent nuclear fuel from a transfer cask to a receiving cask. In one aspect, the system comprises a below grade opening adapted for receiving a cask; a platform positioned within the opening, the platform capable of vertical movement; and at least two jacks for vertically moving the platform; wherein the platform is capable of lowering the cask within the opening. In another aspect, the invention is a method of transferring a canister of spent nuclear fuel to a cask comprising the steps of: lowering a receiving cask having a height into a below grade opening so that a portion of the receiving cask's height is below grade level; and transferring the canister to the receiving cask.

15 Claims, 9 Drawing Sheets

BELOW GRADE CASK TRANSFER FACILITY

CROSS-REFERENCE TO RELATED APPLICATIONS

This application is a divisional of U.S. patent application Ser. No. 10/068,093, filed Feb. 5, 2002 now U.S. Pat. No. 6,793,450, which is hereby incorporated by reference in its entirety.

FIELD OF THE INVENTION

This invention relates to the field of storing and transferring spent nuclear fuel and specifically to a method and system for transferring spent nuclear fuel from a transfer cask to a receiving cask.

BACKGROUND OF THE INVENTION

In the operation of nuclear reactors, it is customary to remove fuel assemblies after their energy has been depleted down to a predetermined level. Upon removal, this spent nuclear fuel is still highly radioactive and produces considerable heat, requiring that great care be taken in its packaging, transporting, and storing. In order to protect the environment from radiation exposure, spent nuclear fuel is first placed in a canister. The loaded canister is then transported and stored in large cylindrical containers called casks. A transfer cask is used to transport spent nuclear fuel from location to location while a storage cask is used to store spent nuclear fuel for a determined period of time.

In a typical nuclear power plant, spent nuclear fuel is loaded into a canister while submerged in a pool of water. The canister is sealed and loaded into a transfer cask while still submerged in the pool. Once loaded with the canister, the transfer cask is used to transport the canister to a receiving cask (i.e., a storage cask or a transport cask). The loaded canister is then transferred from the transfer cask to the receiving cask for either storage or further transport. During transfer from the transfer cask to the receiving cask, it is imperative that the loaded canister is not exposed to the environment.

As a result of this need, the prior method for transferring a loaded canister from a transfer cask to a receiving cask is to raise the transfer cask above the receiving cask and secure the transfer cask atop the receiving cask so that the casks are in a vertically stacked orientation. The transfer cask is adapted so that its bottom can be opened while it remains stacked upon an open receiving cask. Once the bottom of the transfer cask is opened, the loaded canister is lowered from the transfer cask into the receiving cask with a negligible amount of radiation exposure to operations personnel.

Most casks are very large structures and can weigh up to 250,000 lbs. and have a height of 16 ft. or more. As such, stacking a transfer cask atop a receiving cask requires a lot of space a large overhead crane and possibly a restraint system for stabilization. Typically, the transfer of a loaded canister using this stacking method is done inside a 10 C.F.R. 50 structure of a nuclear power plant, which is fully equipped with an overhead crane and radiation containment devices to protect the health and safety of the surrounding communities in the event of a loading mishap. However, numerous nuclear power plants do not possess a 10 C.F.R. 50 qualified staging area that is either large enough to accommodate the stacking of the transfer cask and receiving cask, qualified to support the load of the stacked casks, and/or possesses qualified load handling equipment to make the canister transfer indoors. For such sites, the canister transfer must be completed outdoors using systems and devices that provide the same or greater level of operational safeguards that are available inside a nuclear power plant structure that is fully certifiable for indoor transfer.

SUMMARY OF THE INVENTION

It is an object of the present invention to provide a method and system for transferring a loaded canister of spent nuclear fuel from a transfer cask to a receiving cask that requires less vertical space.

Another object of the present invention is to provide a method and system for outdoor transfer of a loaded canister of spent nuclear fuel from a transfer cask to a receiving cask outdoors that provides the same or greater level of operational safeguards that are available inside a fully certified nuclear power plant structure.

Yet another object of the present invention is to provide a method and system for ergonomically completing cask operations necessary for transferring a loaded canister of spent nuclear fuel from a transfer cask to a receiving cask.

Still another object of the present invention is to provide a method and system that greatly enhances the radiation shielding during the transfer of a spent nuclear fuel from a transfer cask to a receiving cask.

Another object of the present invention is to provide a method and system that eliminates personnel lifts and scaffolding that is needed to complete transfer of spent nuclear fuel from a transfer cask stacked atop a receiving cask to the receiving cask.

These objects and others are met by the present invention which in one aspect is a system for transferring spent nuclear fuel to a cask comprising a below grade opening adapted for receiving a cask; a cask support means positioned within the opening, the cask support means capable of vertical movement; and means for vertically moving the cask support means; wherein the cask support means is capable of lowering the cask within the opening.

Preferably, the system further comprises a shell having a cross section, the shell forming walls of the opening wherein the cross section of the shell is slightly larger than the cross section of the cask. The shell and the cask are usually cylindrical.

Also preferably, the means for vertically moving the cask support means is at least two lifting jacks. Moreover, the at least two jacks can be coupled so as to keep the cask support means approximately level during vertical movement. In the preferred embodiment of the system, the number of lifting jacks is three and are located outside the opening and accessible from grade level.

The cask support means has a fully lowered position and a fully raised position. Preferably, when the cask support means is in the fully raised position, the cask support means is below grade. Also preferably, when the cask support means is in the fully lowered position and supporting a cask having a height, at least a major portion of the cask's height is below grade, with approximately 30 inches of the cask above grade when the cask support means is in the fully lowered position and supporting a cask.

The opening can have a bottom, and the system can further comprise a setdown structure positioned at the bottom of the opening and below the cask support means. In such an embodiment, when the cask support means is in a fully lowered position, the cask support means contacts the setdown structure and the cask support means, and any load being borne by the cask support means is supported by the setdown structure. Preferably, the cask support means is a platform having a center and a top surface wherein the cask support means has a hole near the center and a plurality of cask positioning plates on the top surface.

The system can further include vertical guide rods on which the cask support means can move. Preferably, the vertical guide rods have a top and a bottom, the vertical guide rods being secured at the top so that upon loading the cask support means, the vertical guide rods are in tension.

In another aspect, the invention is a method of transferring a canister of spent nuclear fuel to a cask comprising the steps of: lowering a receiving cask having a height into a below grade opening so that a portion of the receiving cask's height is below grade level; and transferring the canister to the receiving cask.

The preferred method further comprises placing the receiving cask on a cask support means located within the opening, the cask support means capable of vertical movement; lowering the receiving cask into the opening by lowering the cask support means; aligning the canister above the receiving cask; and lowering the canister into the receiving cask.

Preferably, jacks are used to lower the cask support means wherein the lifting jacks can be coupled so as to keep the cask support means approximately level during vertical movement. The preferred number of lifting jacks is three and the jacks are preferably outside the opening and are accessible from grade level.

Also preferably, a shell having a cross section can be used to form walls of the opening. The shell and the receiving cask can be cylindrical. The cross section of the shell is preferably slightly larger than the cross section of the cask. Also preferably one or more lateral restraints are inserted between the shell and receiving cask.

Preferably, the cask support means has a fully lowered position and a fully raised position, wherein when the cask support means is in the fully raised position the cask support means is below grade level. Also preferably, when the cask support means is in the fully lowered position, at least a major portion of the cask's height is below grade level. When the cask support means is in the fully lowered position, it is preferable that about 30 inches of the cask be above grade level.

The opening preferably has a bottom with a setdown structure positioned at the bottom of the opening and below the cask support means. It is preferable that when the cask support means is in a fully lowered position, the cask support means contacts the setdown structure, the cask support means and any load being borne by the cask support means being supported by the setdown structure.

Preferably, the cask support means is a platform having a center and a top surface wherein the cask support means has a hole near the center and a plurality of cask positioning plates positioned on the top surface. Also preferably, the cask support means moves along a plurality of vertical guide rods. It is preferred that the vertical guide rods have a top and a bottom, the vertical guide being secured at the top so that any loading from the cask support means results in the vertical guide rods being in tension.

DETAILED DESCRIPTION

Figure 1:
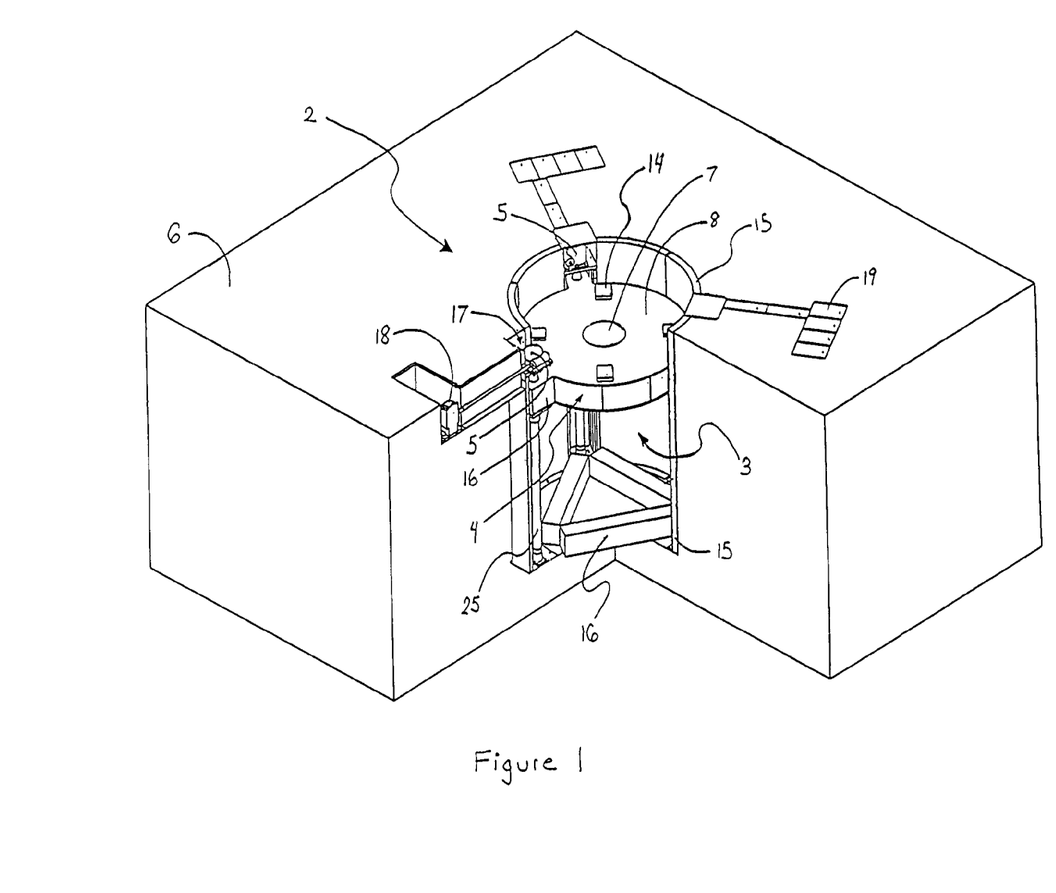
FIG. 1 is a perspective view partially in section of the system of the present invention, a below grade cask transfer facility.

FIG. 1 illustrates an embodiment of the system of the present invention, a below grade cask transfer facility ("CTF") 2. As used herein, the term "below grade" means elevationally below ground surface level 6. Generally, CTF 2 comprises below grade opening 3, circular platform, and at least two jacks 5. In the illustrated embodiment, there are three high-capacity jacks 5 (only two are visible in the illustration). While jacks 5 are used to vertically move circular platform 4, circular platform 4 can be vertically moved by any type of pneumatic or mechanical lifting device capable of lifting the applied load.

Figure 2:
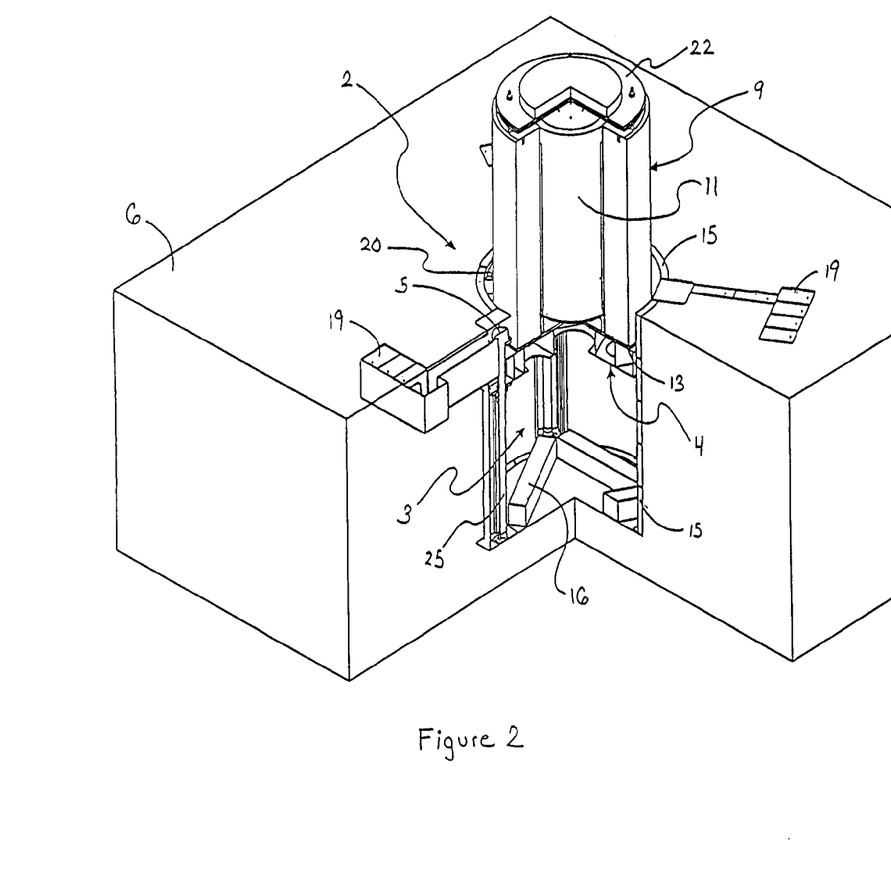
FIG. 2 is a perspective view partially in section of the cask transfer facility wherein a circular platform is in a fully raised position and supporting a loaded receiving cask partially in section.

Referring to FIG. 2, CTF 2 is constructed so that receiving cask 9 having lid 22, top surface 12 (FIG. 5) and base 13 can be placed on and supported by platform 4. Receiving cask 9 can be a storage cask or a transport cask. Receiving cask 9 is placed on platform 4 when platform 4 is in a fully raised position. When platform 4 is in the fully raised position, top surface 8 (FIG. 1) of platform 4 is below grade. When receiving cask 9 is placed thereon, base 13 of receiving cask 9 is also below grade, preferably about 40 inches. Platform 4 is capable of vertical movement, including lowering receiving cask 9 into opening 3.

Figure 3:
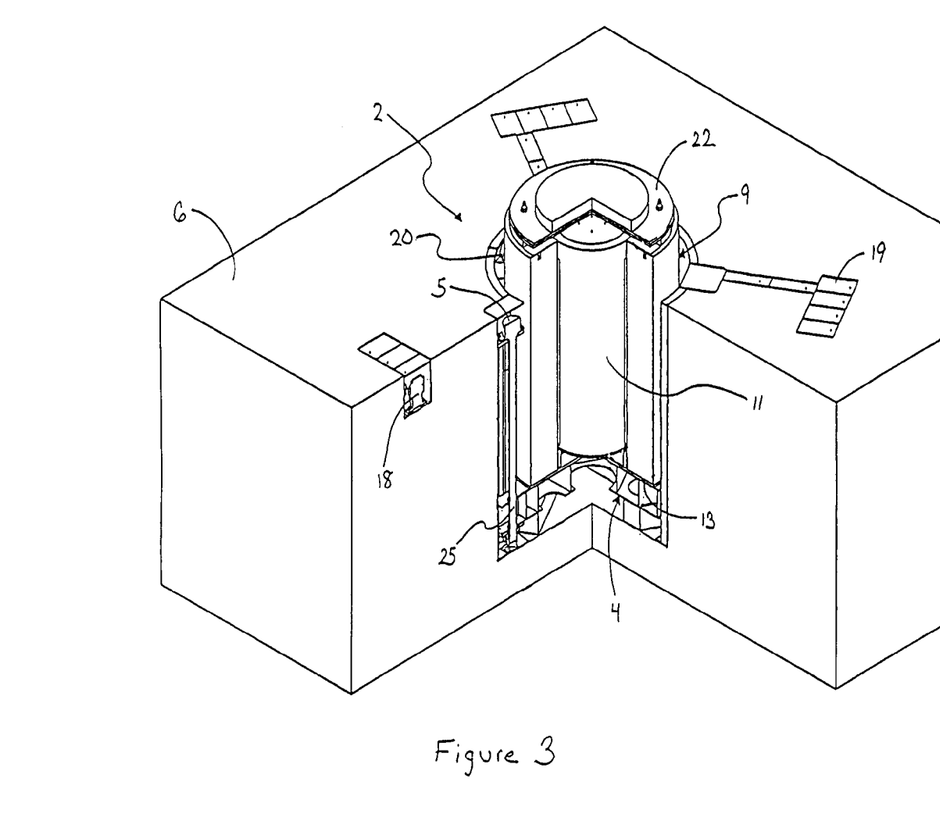
FIG. 3. is a perspective view partially in section of the cask transfer facility wherein the circular platform is in a fully lowered position and supporting a loaded receiving cask partially in section.
Figure 4:
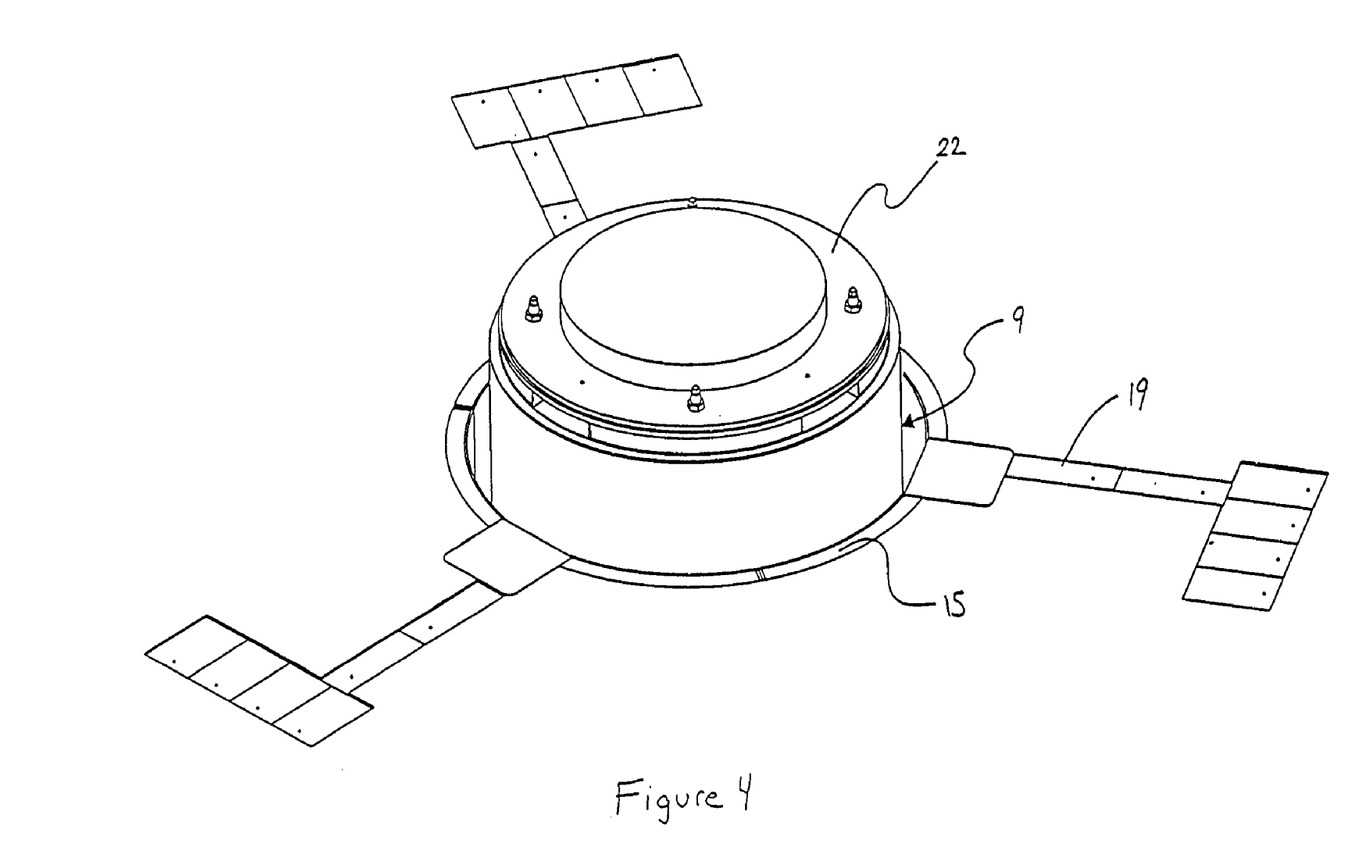
FIG. 4 is a side elevational view of a receiving cask with a lid and fully lowered into the cask transfer facility.

Referring to FIGS. 3 and 4, platform 4 can be lowered to a fully lowered position while supporting receiving cask 9. CTF 2 is designed so that when platform 4 is supporting receiving cask 9 and in the fully lowered position, receiving cask 9 is in a position wherein a majority of its height is below grade. Preferably, all of receiving cask 9 will be below grade except about 30 inches. When all but about 30 inches of receiving cask 9 is below grade, top surface 12 (FIG. 5) of receiving cask 9 is at an ergonomic height to facilitate cask operations.

Referring to FIGS. 1 and 2, in the illustrated embodiment, CTF 2 further comprises a shell 15 that forms the walls of opening 3. In constructing CTF 2, shell 15 is placed in an oversized hole in the ground 6 and leveled approximately flush with the ground surface 6. The area surrounding shell 15 can be backfilled with soil and/or concrete to secure shell 15 in the ground 6 and to provide extra radiation shielding.

As such, shell 15 establishes the inner form for a concrete pour. The bottom of shell 15 may be open-bottomed to allow the inside bottom to be filled with concrete and leveled or equipped with setdown structure 16. In the illustrated embodiment, shell 15, opening 3, and receiving cask 9 are cylindrical. However, shell 15, opening 3, and receiving cask 9 can be made to be any shape or size.

Preferably, shell 15 has a cross-section that is shaped and sized so that there is a tight clearance between shell 15 and receiving cask 9 when receiving cask 9 is resting on platform 4. Having a tight clearance between shell 15 and receiving cask 9 provides a safeguard against receiving cask 9 tipping over during a seismic event. When there is a tight clearance between shell 15 and receiving cask 9, receiving cask 9 can not tip over during a seismic event when receiving cask 9 is resting on platform 4 in the fully lowered position. When receiving cask 9 is resting on platform 4 in the fully raised position, base 13 of receiving cask 9 is below grade. Thus, a portion of receiving cask 9 forms a tight clearance with shell 15, providing seismic stabilization and decreasing the chance that receiving cask 9 will tip over during a seismic event.

Additionally, shell 15 is designed to have a plurality of extension spaces 17 for mounting jacks 5. Extension spaces 17 provide space outside the main circumference of shell 15 so that jacks 5 do not contact or interfere with receiving cask 9 when it is lowered. Because jacks 5 are mounted to shell 15, shell 15 provides the support for jacks 5 during lifting and lowering of platform 4 (and any applied load). Shell 15 also provides lateral support of platform 4 during operations.

While in the illustrated embodiment, shell 15 is used to form the walls of opening 3, CTF 2 can be constructed without employing shell 15. In such a situation, opening 3 is formed by digging a hole in ground 6 that approximates the desired size of opening 3.

In FIG. 1, platform 4 is a circular platform having hole 7. Hole 7 provides personnel access to the underside of the circular platform. Alternatively, platform 4 can be a frame or other structure capable of supporting receiving cask 9 containing loaded canister 11. As illustrated, platform 4 has top surface 8 with cask positioning plates 14 located thereon. Cask positioning plates 14 act as key ways to help center receiving cask 9 on platform 4 and within opening 3.

Platform 4 is designed to approximate the shape and size of receiving cask 9, with projections 16. Platform 4 is a rugged steel weldment that provides support for receiving cask 9 and transmits lateral loads to shell 15 during seismic events. Platform 4 also transmits the lifting and controlled lowering forces supplied by jacks 5 to receiving cask 9. This is accomplished by projections 16 that form lifting locations for jacks 5. Projections 16 ride inside extension spaces 17.

Jacks 5 are located just outside the main diameter of the shell 15 in extension spaces 17. Jacks 5 are supported at their top end in extension spaces 17. Jacks 5 comprise guide rods 25 that guide the movement of platform 4. Because jacks 5 are connected to shell 15 only at their top, vertical guide rods 25 are in constant tension under loading conditions, which eliminates the danger of "buckling." When jacks 5 lower platform 4 and any load supported thereby to the fully lowered position, platform 4 contacts and rests on setdown structure 16. At this position, setdown structure 16 bears the entire load of platform 4 (and any load supported thereby), freeing jacks 5 and vertical guide rods 25 from supporting the applied load (FIG. 3).

Jacks 5 are coupled mechanically or electronically to keep platform 4 level during lifting operations. Jacks 5 provide sufficient lift force to raise the platform 4 when loaded with receiving cask 9 and are overrated to provide an extra safety margin. Jacks 5 contact the underside of projections 16 of platform 4 in extension spaces 17. All parts of jacks 5 and their drives 18 are located below grade to prevent interference with delivery of transfer cask. Jacks 5 and their drives 18 are situated in shallow steel or concrete-lined trenches and covered with removable, recessed covers 19.

Drives 18 and their control system provide the power and control for jacks 5. An electronic feedback system monitors the position of each jack 5 to maintain synchronous movement of platform 4. Redundant position switches (not illustrated) limit the travel beyond established points (independent of the drive and control system). Level monitoring switches independently monitor the platform level and shut off jack drives 18 if an out-of-level condition is detected. The control station is located near CTF 2 but is sufficiently far away for the operator to oversee the movement operations. Power and control wires going from the control station to drives 18 are located underground to prevent interference and damage during cask operations.

CTF 2 is used to facilitate the transfer of a canister of spent nuclear fuel from a transfer cask to a receiving cask in a more safe, efficient, and cost effective manner.

Referring to FIGS. 1 and 2, in utilizing CTF 2 for the transfer, empty receiving cask 9 is placed on platform 4 when platform 4 is in the fully raised position. As receiving cask 9 is placed on platform 4, cask positioning plates 14, located on the top surface 8 of platform 4, act as key ways to help center receiving cask 9 in CTF 2.

Referring to FIGS. 3 and 4, platform 4 (with receiving cask 9 positioned thereon) is then lowered to a fully lowered position, leaving top surface 12 (FIG. 5) of receiving cask 9 approximately 30 inches above ground surface level 6. A set of lateral restraints 20 can then be installed between receiving cask 9 and shell 15 for sites that are prone to severe earthquakes. Lateral restraints 20 act like hard bumpers to limit the radial movement of receiving cask 9 during a seismic event.

Figure 5:
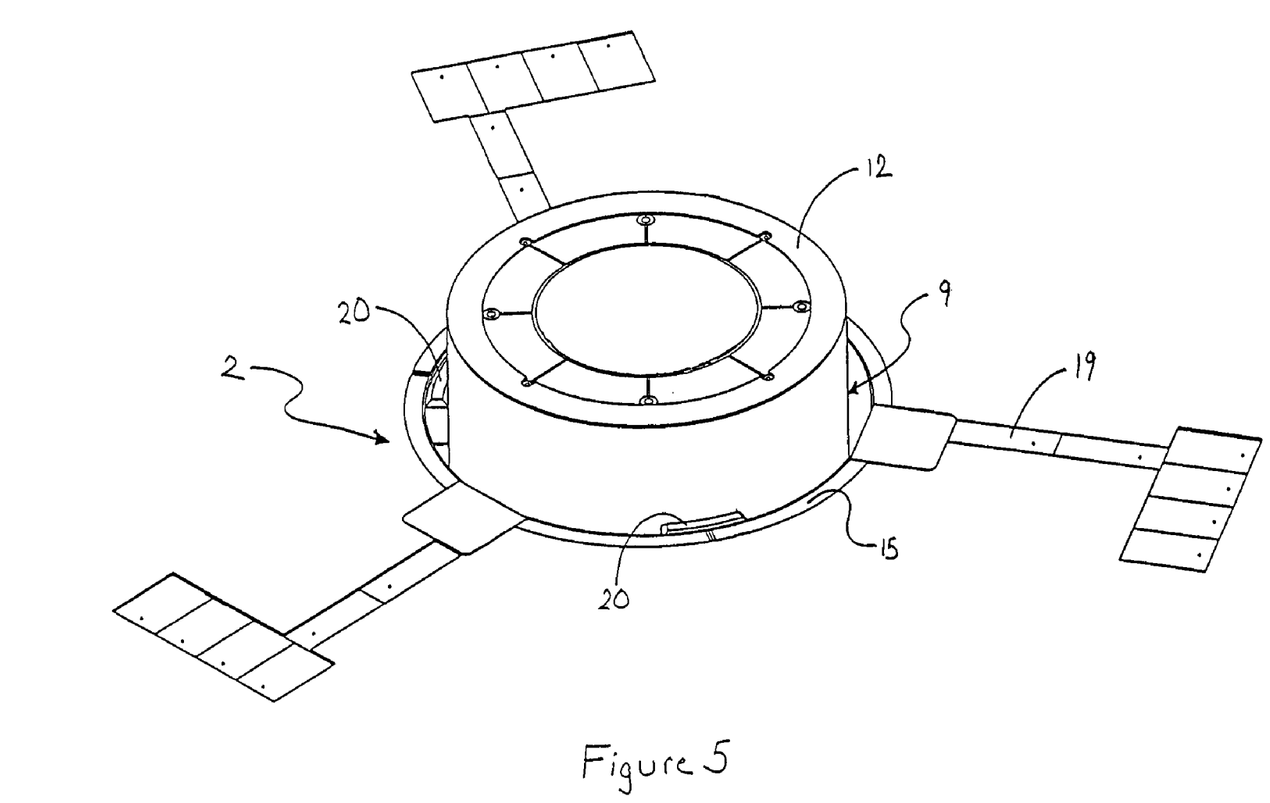
FIG. 5 is a side elevational view of a receiving cask with its lid removed and fully lowered into the cask transfer facility.
Figure 6:
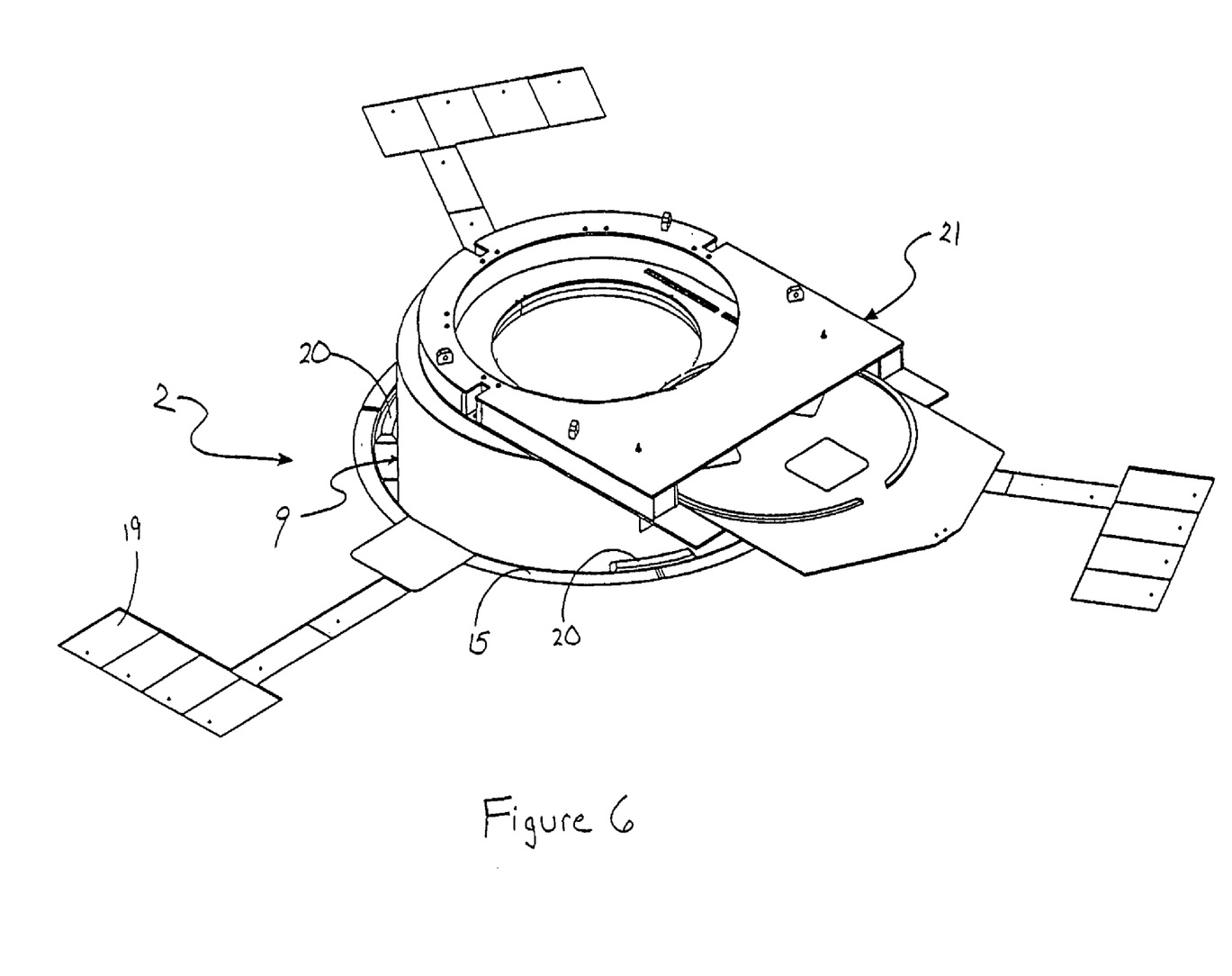
FIG. 6 is a side elevational view of a receiving cask fully lowered into the cask transfer facility with a mating device secured to its top surface.

Referring to FIGS. 5 and 6, lid 22 (FIG. 4) of receiving cask 9 is then removed. In the illustrated embodiment, mating device 21 is then attached to top surface 12 of receiving cask 9. Mating device 21 provides the connection between transfer cask 10 and receiving cask 9. While in the illustrated embodiment, mating device 21 is used to provide a connection between transfer cask 10 and receiving cask 9 (FIG. 7), it is possible to connect transfer cask 10 directly to receiving cask 9. The method of connection is dictated by the specific designs of the transfer cask and receiving cask used and does not affect the scope of the present invention.

Figure 7:
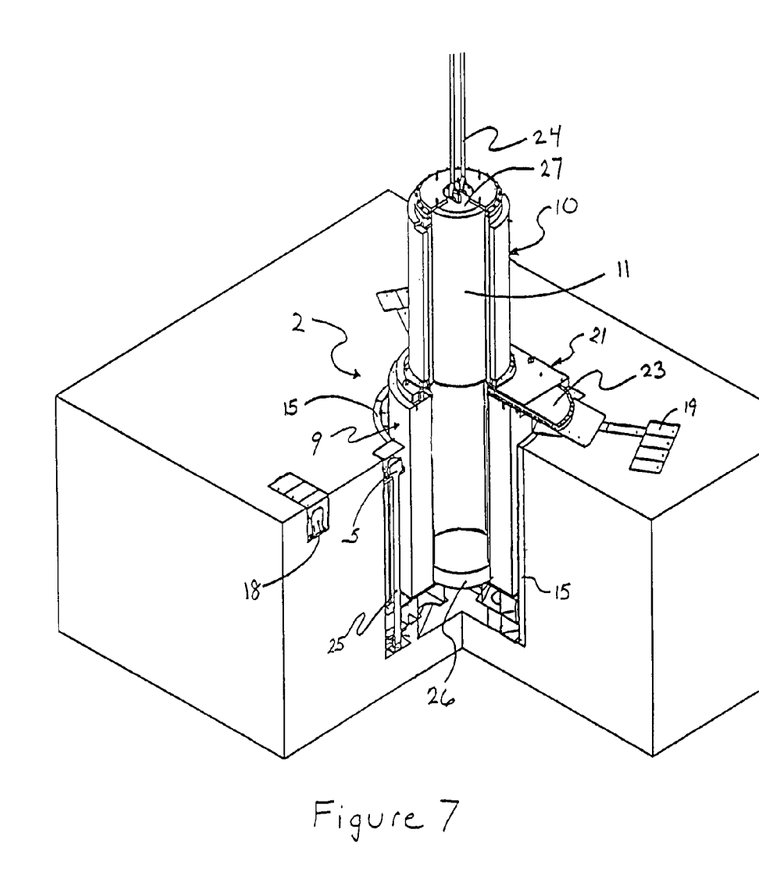
FIG. 7 is a perspective partially in section of a transfer cask holding a canister of spent nuclear fuel placed atop a below grade receiving cask.

Referring to FIG. 7, in the illustrated embodiment, transfer cask 10, containing a loaded and sealed canister 11, is then raised, placed into, and rigidly secured to mating device 21. Base 23 (shown partially in section) of transfer cask 10 is removed using mating device 21, leaving an unobstructed pathway for canister 11 to be lowered into receiving cask 9.

Figure 8:
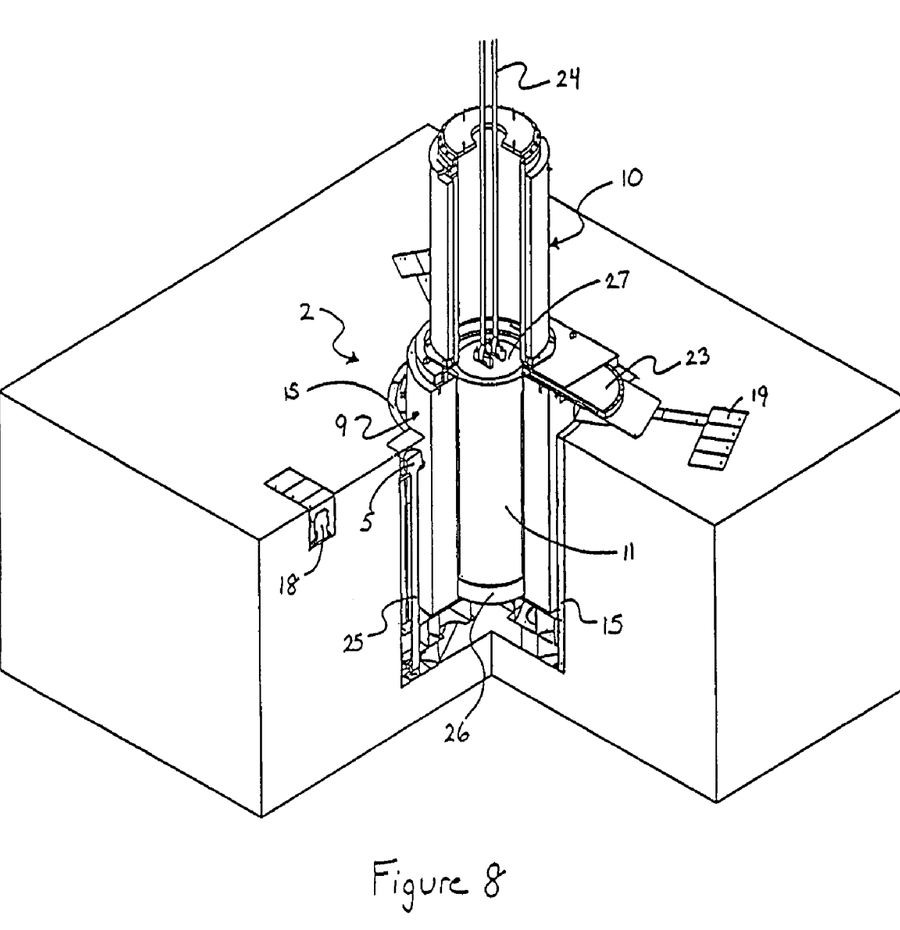
FIG. 8 is a perspective view partially in section of a transfer cask placed atop a below grade receiving cast wherein the canister of spent nuclear fuel has been lowered into the receiving cask.

Referring to FIG. 8, canister 11, using slings 24 attached to top surface 27 of canister 11, is then fully lowered into receiving cask 9 until canister 11 contacts bottom 26 of receiving cask 9. Slings 24 are disconnected and empty transfer cask 10 and mating device 21 are removed (not illustrated).

Figure 9:
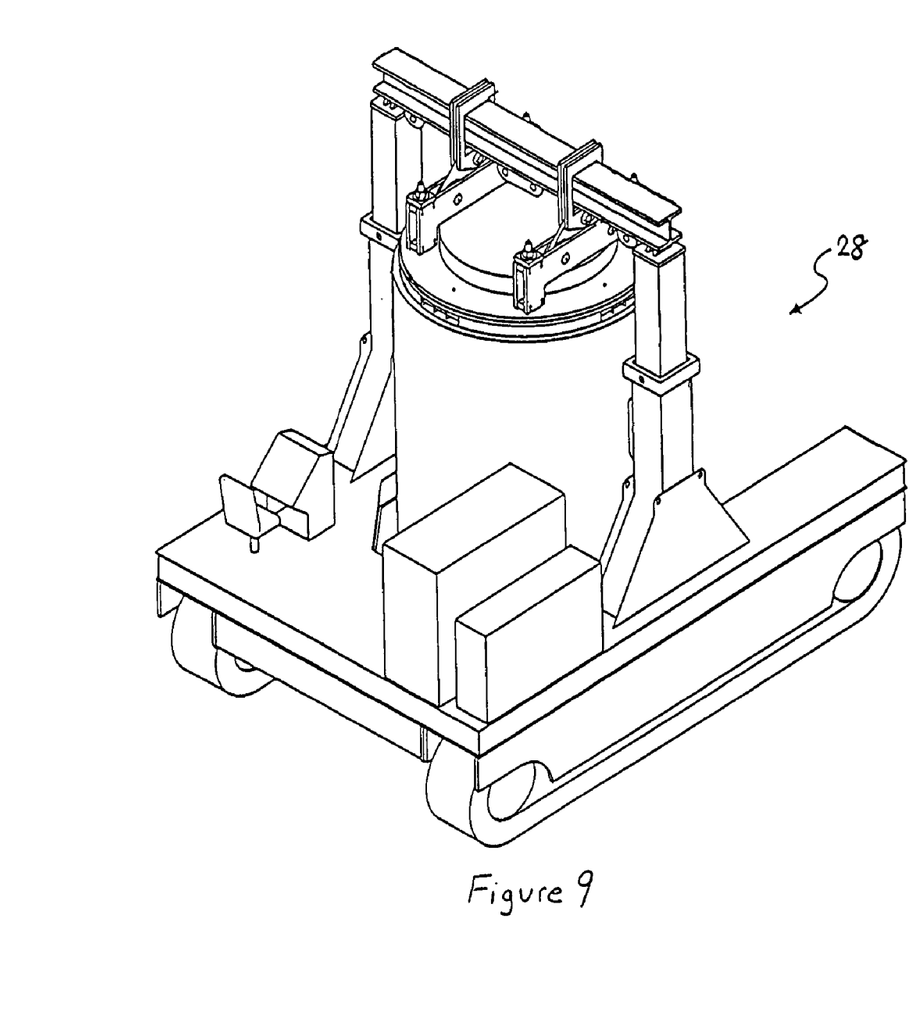
FIG. 9 is a perspective view of a cask transporter used in connection with the system of the present invention.

Lid 22 is then placed back on and secured to receiving cask 9. Receiving cask 9 is then raised by platform 4 of CTF 2 to the fully raised position. Receiving cask 9 is then lifted and removed from CTF 2 by cask transporter 28 (FIG. 9) or some other lifting device such as a crane.

The loading operations for transferring a loaded canister from a transfer cask to a receiving cask summarized above aid in understanding the operations of CTF 2. Actual operations and cask-specific equipment at a particular nuclear site may vary from those described herein.

The foregoing discussion discloses and describes merely exemplary embodiments of the present invention. As will be understood by those skilled in this art, the invention may be embodied in other specific forms without departing from the spirit or essential characteristics thereof. Accordingly, the disclosure of the present invention is intended to be illustrative, but not limiting, of the scope of the invention, which is set forth in the following claims.

What is claimed is:

1. A method of transferring a canister of spent nuclear fuel comprising:
    placing an empty receiving cask having a height on a support capable of vertical movement;
    lowering the support into a below grade cavity so that a portion of the receiving cask's height is below grade level;
    positioning a transfer cask containing a canister of spent nuclear fuel above the receiving cask; and
    lowering the canister of spent nuclear fuel from the transfer cask into the receiving cask.

2. The method of claim 1 wherein the support comprises a plurality of guide rods and wherein the support moves along the plurality of vertical guide rods, the vertical guide rods having a top and a bottom, the vertical guide rods being secured at the top so that any loading from the support results in the vertical guide rods being in tension.

3. The method of claim 1 further comprising the step of providing a setdown structure positioned at a bottom of the cavity, and wherein the step of lowering the empty receiving cask further comprises lowering the support until the support contacts the setdown structure so that any load being borne by the support is supported by the setdown structure.

4. The method of claim 1 wherein at least two jacks are used to lower the support.

5. The method of claim 1 wherein the at least two lifting jacks are coupled so as to keep the support approximately level during vertical movement.

6. The method of claim 5 wherein the jacks are outside the cavity and are accessible from grade level.

7. The method of claim 1 wherein the support has a fully lowered position and a fully raised position.

8. The method of claim 7 wherein when the support is in the fully raised position the support is below grade level.

9. The method of claim 7 wherein when the support is in the fully lowered position, at least a major portion of the receiving cask's height is below grade level.

10. The method of claim 1 wherein the support is a platform having a center and a top surface, the support having a hole near the center and a plurality of cask positioning plates positioned on the top surface.

11. The method of claim 1 wherein the step of lowering the empty receiving cask comprises lowering the empty receiving cask into the cavity until at least a major portion of the receiving cask's height is below grade.

12. The method of claim 11 wherein the empty receiving cask is lowered into the cavity until about 30 inches of the receiving cask is above grade level.

13. The method of claim 1 wherein a shell is provided to form walls of the cavity.

14. The method of claim 13 wherein the shell has a horizontal cross section that is of a size that prohibits the receiving cask from tipping over.

15. The method of claim 13 further comprising the step of inserting one or more lateral restraints between the shell and the receiving cask once the receiving cask is lowered.

* * * * *